(12) United States Patent
Chen et al.

(10) Patent No.: US 11,308,024 B2
(45) Date of Patent: Apr. 19, 2022

(54) MULTI-PATH RDMA TRANSMISSION

(71) Applicant: Microsoft Technology Licensing, LLC, Redmond, WA (US)

(72) Inventors: Guo Chen, Redmond, WA (US); Thomas Moscibroda, Beijing (CN); Peng Cheng, Redmond, WA (US); Yuanwei Lu, Redmond, WA (US); Yongqiang Xiong, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/765,389

(22) PCT Filed: Dec. 6, 2018

(86) PCT No.: PCT/US2018/064148
§ 371 (c)(1),
(2) Date: May 19, 2020

(87) PCT Pub. No.: WO2019/118255
PCT Pub. Date: Jun. 20, 2019

(65) Prior Publication Data
US 2020/0334195 A1  Oct. 22, 2020

(30) Foreign Application Priority Data
Dec. 15, 2017  (CN) .......................... 201711352625.4

(51) Int. Cl.
*G06F 15/173* (2006.01)
*H04L 47/11* (2022.01)
(Continued)

(52) U.S. Cl.
CPC ........ *G06F 15/17331* (2013.01); *H04L 47/11* (2013.01); *H04L 47/34* (2013.01);
(Continued)

(58) Field of Classification Search
CPC .... G06F 15/17331; H04L 47/11; H04L 47/34; H04L 47/622; H04L 67/1097; H04L 69/22; H04L 69/10; H04L 69/14
See application file for complete search history.

(56) References Cited

U.S. PATENT DOCUMENTS 6,594,712 B1 * 7/2003 Pettey ..................... G06F 13/28
709/212
10,509,764 B1 * 12/2019 Izenberg ............... G06F 15/167
(Continued)

FOREIGN PATENT DOCUMENTS

| CN | 1578308 A | 2/2005 | |
|---|---|---|---|
| WO | 2017117259 A1 | 7/2017 | |
| WO | WO-2017117259 A1 * | 7/2017 | ............. H04L 49/90 |

OTHER PUBLICATIONS

"ConnectX-3 Pro EN Single/Dual-Port Adapters 10/40/56GbE Adapters w/ PCI Express 3.0", Retrieved from: https://www.mellanox.com/products/ethernet-adapters/connectx-3-pro, Retrieved Date: Jul. 2, 2020, 1 Page.

(Continued)

*Primary Examiner* — Michael A Keller
(74) *Attorney, Agent, or Firm* — Schwegman Lundberg & Woessner, P.A.

(57) ABSTRACT

In accordance with implementations of the subject matter described herein, there provides a solution for multi-path RDMA transmission. In the solution, at least one packet is generated based on an RDMA message to be transmitted from a first device to a second device. The first device has an RDMA connection with the second device via a plurality of paths. A first packet in the at least one packet includes a plurality of fields, which include information for transmitting the first packet over a first path of the plurality of paths. The at least one packet is transmitted to the second device over the plurality of paths via an RDMA protocol. The first (Continued)

packet is transmitted over the first path. The multi-path RDMA transmission solution according to the subject matter described herein can efficiently utilize rich network paths while maintaining a low memory footprint in a network interface card.

14 Claims, 8 Drawing Sheets

(51) Int. Cl.
  H04L 47/34    (2022.01)
  H04L 47/62    (2022.01)
  H04L 67/1097  (2022.01)
  H04L 69/22    (2022.01)

(52) U.S. Cl.
  CPC ........ *H04L 47/622* (2013.01); *H04L 67/1097* (2013.01); *H04L 69/22* (2013.01)

(56) References Cited

U.S. PATENT DOCUMENTS

| | | | | |
|---|---|---|---|---|
| 2002/0159385 | A1* | 10/2002 | Susnow | H04L 47/30 370/229 |
| 2017/0187629 | A1* | 6/2017 | Shalev | H04L 29/08 |
| 2019/0116126 | A1* | 4/2019 | Shen | H04L 47/263 |
| 2020/0366610 | A1* | 11/2020 | Wang | H04L 47/35 |

OTHER PUBLICATIONS

"InfiniBandTM Architecture Specification vol. 1 Release 1.2.1", Published by InfiniBand Trade Association, Nov. 2007, 1727 Pages.
"InfiniBandTM Architecture Specification vol. 2 Release 1.3", Published by InfiniBand Trade Association, Nov. 6, 2012, 557 Pages.
"Linux/include/linux/mlx4/qp.h", Retrieved from: http://web.archive.org/web/20160618041658/http://lxr.free-electrons.com/source/include/linux/mlx4/qp.h, Jun. 18, 2016, 8 Pages.
"Ns-3", Retrieved from: https://web.archive.org/web/20171007123726/https://www.nsnam.org/, Oct. 7, 2017, 2 Pages.
"Priority Flow Control: Build Reliable Layer 2 Infrastructure", In White Paper of Cisco, 2009, pp. 1-8.
"802.1Qbb—Priority-based Flow Control", Retrieved from: https://1.ieee802.org/dcb/802-1qbb/, Retrieved Date: Jul. 2, 2020, 3 Pages.
"RoCE vs. iWARP Competitive Analysis", In White Paper of Mellanox Technologies, Feb. 2017, 6 Pages.
"Stratix v FPGAs", Retrieved from: http://web.archive.org/web/20171029102112/https://www.altera.com/products/fpga/stratix-series/stratix-v/overview.html, Oct. 29, 2017, 2 Pages.
"Supplement to InfiniBandTM Architecture Specification vol. 1 Release 1.2.1, annex A17: RoCEv2", Published by InfiniBand Trade Association,, Sep. 2, 2014, 23 Pages.
Al-Fares, et al., "A Scalable, Commodity Data Center Network Architecture", In Proceedings of the ACM SIGCOMM Computer Communication Review, vol. 38, Issue 4, Aug. 17, 2008, pp. 63-74.
Al-Fares, et al., "Hedera: Dynamic Flow Scheduling For Data Center Networks", In Proceedings of the 7th USENIX Conference on Networked Systems Design and Implementation, Apr. 28, 2010, 15 Pages.
Alizadeh, et al., "Analysis of DCTCP: Stability, Convergence, and Fairness", In Proceedings of the ACM SIGMETRICS Joint International Conference on Measurement And Modeling of Computer Systems, Jun. 7, 2011, pp. 73-84.
Alizadeh, et al., "CONGA: Distributed Congestion-Aware Load Balancing for Datacenters", In Proceedings of the ACM Conference on SIGCOMM, Aug. 17, 2014, pp. 503-514.
Alizadeh, et al., "Data Center TCP (DCTCP)", In Proceedings of the ACM SIGCOMM Conference, Aug. 30, 2010, pp. 63-74.

Benson, et al., "MicroTE: Fine Grained Traffic Engineering for Data Centers", In Proceedings of the Seventh Conference on Emerging Networking Experiments and Technologies, Dec. 6, 2011, pp. 1-12.
Cao, et al., "Delay-based Congestion Control for Multipath TCP", In Proceedings of the 20th IEEE International Conference on Network Protocols (ICNP), Oct. 30, 2012, 10 Pages.
Cao, et al., "Explicit Multipath Congestion Control for Data Center Networks", In Proceedings of the Ninth ACM Conference on Emerging Networking Experiments and Technologies, Dec. 9, 2013, pp. 73-84.
Cao, et al., "Per-packet Load-balanced, Low-Latency Routing for Clos-based Data Center Networks", In Proceedings of the Ninth ACM Conference on Emerging Networking Experiments and Technologies, Dec. 9, 2013, pp. 49-60.
Chen, et al., "Fast and Cautious: Leveraging Multi-path Diversity for Transport Loss Recovery in Data Centers", In Proceedings of the USENIX Annual Technical Conference, Jun. 22, 2016, pp. 29-42.
Cooper, et al., "Benchmarking Cloud Serving Systems with YCSB", In Proceedings of the 1st ACM Symposium on Cloud Computing, Jun. 10, 2010, pp. 143-154.
Dixit, et al., "On the Impact of Packet Spraying in Data Center Networks", In Proceedings of the IEEE INFOCOM, Apr. 14, 2013, pp. 2130-2138.
Dragojevic, et al., "FaRM: Fast Remote Memory", In Proceedings of the 11th USENIX Symposium on Networked Systems Design and Implementation, Apr. 2, 2014, pp. 401-414.
Finn, Norm, "802.1Qau—Congestion Notification", Retrieved from: https://1.ieee802.org/dcb/802-1qau/, Apr. 23, 2010, 9 Pages.
Floyd, et al., "Random Early Detection Gateways for Congestion Avoidance", In Proceedings of the IEEE/ACM Transactions on Networking, vol. 1, Issue 4, Aug. 1993, pp. 397-413.
Floyd, et al., "The NewReno Modification to TCP's Fast Recovery Algorithm", Retrieved from: https://dl.acm.org/doi/pdf/10.17487/RFC3782, Apr. 2004, pp. 1-19.
Greenberg, et al., "VL2: A Scalable and Flexible Data Center Network", In Proceedings of the ACM SIGCOMM Conference on Data Communication, Aug. 17, 2009, pp. 51-62.
Guo, et al. "Pingmesh: A Large-Scale System for Data Center Network Latency Measurement and Analysis", In Proceedings of the ACM Conference on Special Interest Group on Data Communication, Aug. 17, 2015, pp. 139-152.
Guo, et al., "RDMA over Commodity Ethernet at Scale", In Proceedings of the ACM SIGCOMM Conference, Aug. 22, 2016, pp. 202-215.
He, et al., "Presto: Edge-based Load Balancing for Fast Datacenter Networks", In Journal of ACM SIGCOMM Computer Communication Review, vol. 45, Issue 4, Aug. 17, 2015, pp. 465-478.
Hughes, et al., "Issues in TCP Slow-Start Restart After Idle", Retrieved from: https://tools.ietf.org/pdf/draft-ietf-tcpimpl-restart-00.pdf, Mar. 30, 1998, 7 Pages.
Jain, et al., "Throughput Fairness Index: An Explanation", In Technical Report of The Ohio State University, Feb. 1999, 9 Pages.
Kalia, et al., "Design Guidelines for High Performance RDMA Systems", In Proceedings of the USENIX Annual Technical Conference, Jun. 22, 2016, pp. 437-450.
Kalia, et al., "FaSST: Fast, Scalable and Simple Distributed Transactions with Two-sided (RDMA) Datagram RPCs", In Proceedings of the 12th USENIX Conference on Operating Systems Design and Implementation, Nov. 2, 2016, pp. 185-201.
Katta, et al., "CLOVE: How I Learned to Stop Worrying About the Core and Love the Edge", In Proceedings of the 15th ACM Workshop on Hot Topics in Networks, Nov. 9, 2016, pp. 155-161.
Li, et al., "ClickNP: Highly Flexible and High Performance Network Processing with Reconfigurable Hardware", In Proceedings of the ACM SIGCOMM Conference, Aug. 22, 2016, pp. 1-14.
Lu, et al., "Memory Efficient Loss Recovery for Hardware-based Transport in Datacenter", In Proceedings of the First Asia-Pacific Workshop on Networking, Aug. 3, 2017, pp. 22-28.
Mittal, et al., "TIMELY: RTT-based Congestion Control for the Datacenter", In Journal of ACM SIGCOMM Computer Communication Review, vol. 45, Issue 4, Aug. 17, 2015, pp. 537-550.

(56) References Cited

OTHER PUBLICATIONS

"International Search Report and Written Opinion Issued in PCT Application No. PCT/US2018/064148", dated Mar. 28, 2019, 12 Pages.

Perry, et al., "Fastpass: A Centralized "Zero-Queue" Datacenter Network", In Proceedings of the ACM Conference on SIGCOMM, Aug. 17, 2014, pp. 307-318.

Raiciu, et al., "Improving Datacenter Performance and Robustness with Multipath TCP", In Journal of ACM SIGCOMM Computer Communication Review, vol. 41, Issue 4, Aug. 15, 2011, pp. 266-277.

Rasley, et al., "Planck: Millisecond-scale Monitoring and Control for Commodity Networks", In Journal of ACM SIGCOMM Computer Communication Review, vol. 44, Issue 4, Aug. 17, 2014, pp. 407-418.

Raz, Elad, "Multi-Path RDMA", In Proceedings of the 11th Annual International Openfabrics Software Developers' Workshop, Mar. 15, 2015, 18 Pages.

Roy, et al., "Inside the Social Network's (Datacenter) Network", In Proceedings of the ACM Conference on Special Interest Group on Data Communication, Aug. 17, 2015, pp. 123-137.

Singh, et al., "Jupiter Rising: A Decade of Clos Topologies and Centralized Control in Google's Datacenter Network", In Journal of ACM SIGCOMM Computer Communication Review, vol. 45, Issue 4, Aug. 17, 2015, pp. 183-197.

Vanini, et al., "Let It Flow: Resilient Asymmetric Load Balancing with Flowlet Switching", In Proceedings of the 14th USENIX Symposium on Networked Systems Design and Implementation (NSDI '17), Mar. 27, 2017, pp. 407-420.

Wu, et al., "GRAM: Scaling Graph Computation to the Trillions", In Proceedings of the Sixth ACM Symposium on Cloud Computing, Aug. 27, 2015, pp. 408-421.

Zhu, et al., "Congestion Control for Large-Scale RDMA Deployments", In Journal of ACM SIGCOMM Computer Communication Review, vol. 45, Issue 4, Aug. 17, 2015, pp. 523-536.

Lu, et al., "Multi-Path Transport for RDMA in Datacenters", In Proceedings of the 15th USENIX Symposium on Networked Systems Design and Implementation, Apr. 9, 2018, pp. 357-371.

"Office Action Issued in European Patent Application No. 18839782. 2", dated Jul. 19, 2021, 13 Pages.

"First Office Action and Search report Issued in Chinese Patent Application No. 201711352625.4", dated Jan. 4, 2022, 17 Pages.

\* cited by examiner

MULTI-PATH RDMA TRANSMISSION

CROSS-REFERENCE TO RELATED APPLICATION

This application is a U.S. National Stage Filing under 35 U.S.C. 371 of International Patent Application Serial No. PCT/US18/064148, filed Dec. 6, 2018, and published as WO 2019/118255 on Jun. 20, 2019, which claims priority to Chinese Application No. 201711352625.4, filed Dec. 15, 2017, which applications and publication are incorporated herein by reference in their entirety.

BACKGROUND

Modern datacenter applications require network transmission with high throughout and low latency to meet the increasing demands from customers. Compared with a conventional software transport protocol like Transmission Control Protocol (TCP), Remote Direct Memory Access (RDMA) implements the entire transport logic in a network interface card (NIC) and allows a direct access to a remote memory without involvement of a Central Processing Unit (CPU) or an operation system. Therefore, RDMA enables high throughput and ultra-low latency of network transmission with little involvement of a CPU.

However, the existing RDMA typically supports only single-path transmission. That is, there is only an RDMA connection via a single network path between a transmitting device and a receiving device. If the single network path fails, the RDMA connection between the transmitting device and the receiving device may be probably unable to work well. Moreover, the single-path transmission can hardly take advantage of rich network paths in the datacenter network.

SUMMARY

In accordance with implementations of the subject matter described herein, there provides a solution for multi-path RDMA transmission. In the solution, at least one packet is generated based on an RDMA message to be transmitted from a first device to a second device. The first device has an RDMA connection with the second device via a plurality of paths. A first packet in the at least one packet includes a plurality of fields, which include information for transmitting the first packet over a first path of the plurality of paths. The at least one packet is transmitted to the second device over the plurality of paths via an RDMA protocol. The first packet is transmitted over the first path. The multi-path RDMA transmission solution according to the subject matter described herein can efficiently utilize rich network paths while maintaining a low memory footprint in a network interface card.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION OF EMBODIMENTS

Figure 1:
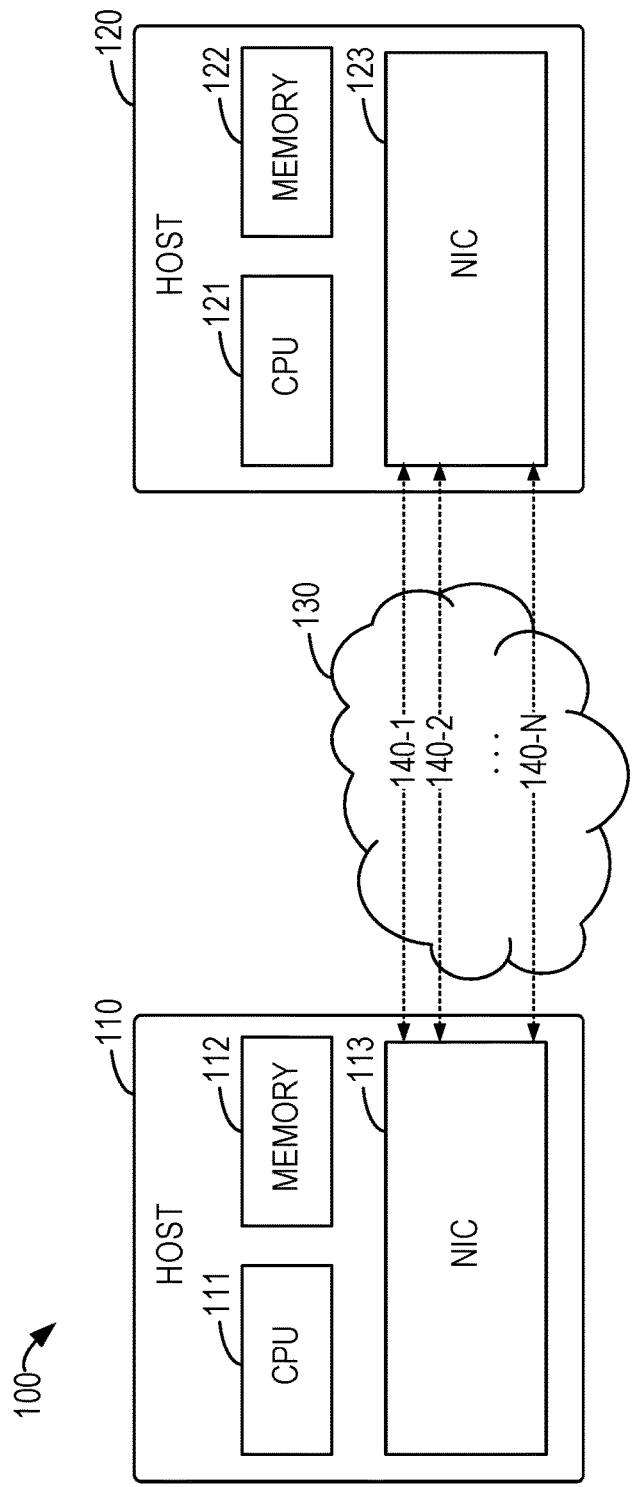
FIG. 1 is a block diagram of an example environment in which implementations of the subject matter described herein can be implemented.

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open-ended terms that mean "includes, but is not limited to." The term "based on" is to be read as "based at least in part on." The terms "an implementation" and "an example implementation" are to be read as "at least one implementation." The term "another implementation" is to be read as "at least one other implementation." The terms "first," "second," and the like may refer to different or same objects. Other definitions, explicit and implicit, may be included below.

Overview of RDMA

RDMA enables a direct memory access to a remote system through NIC hardware. Therefore, RDMA can provide high throughput and low latency with little CPU involvement on either local or remote end. RDMA may be implemented over two transmission networks, namely an InfinitBand network and Ethernet. Over the Ethernet, according to different protocol stacks converged with the Ethernet, the RDMA protocol may be classified as a TCP-based RDMA protocol (iWARP) and a RDMA protocol over the converged Ethernet (RoCE, including RoCEv1 and RoCEv2). In the context, the RoCEv2 protocol will be described as an example. However, it is to be understood that this is merely for the purpose of illustration, without suggesting any limitation to the scope of the subject matter described herein. Implementations of the subject matter described herein are also applicable to the iWARP protocol or the InfiniBand network-based RDMA protocol.

In the RDMA, an RDMA connection may be identified by a pair of work queues, called queue pair (AP). A QP consists of a send queue and a receive queue both of which are maintained on NICs of a transmitting device and a receiving device respectively. When an application initiates an RDMA operation (also called "RDMA verb") to send or retrieve data, it will post a work queue element (WQE) to NIC's send queue or receive queue, respectively. Moreover, to notify the application for operation completion, there is also a completion queue (CQ) associated with each QP. On completing a WQE, a completion queue element (CQE) will be delivered to the CQ.

There are four commonly used RDMA operations (also called RDMA verbs): SEND, RECEIVE, WRITE, and READ. Among these, SEND and RECEIVE are two-sided, meaning that a SEND operation always requires a RECEIVE operation at the other side. READ and WRITE are one-sided operations, meaning that applications can directly read or write a remote memory without involvement of a remote CPU.

The RDMA transmission is message-based, i.e., an RDMA operation is translated into an RDMA message for transmission. The RDMA message will be further divided into multiple equal-sized fields which are encapsulated into User Datagram Protocol (UDP) packet(s). In RoCEv2, all of RDMA data packets use an identical UDP destination port (e.g. 4791), while the UDP source port is arbitrary. The UDP source port varies for different RDMA connections, which allows load-balancing routing protocols to be differentiated. In UDP payloads, an RDMA header is inserted in every packet. The RDMA header contains a packet sequence number (PSN) which provides continuous sequence number for the RDMA packets in the RDMA connection. At the receiving device, RDMA messages are restored according to the PSNs. Moreover, the receiving device may generate an acknowledgement (ACK) or a negative acknowledgement (NACK) to notify the transmitting device of received or lost data packets.

The RDMA transmission requires a lossless network provided by priority-based flow control (PFC). Specifically, the PFC employs hop-by-hop flow control on traffic with pre-configured priorities. With PFC, when a downstream switch detects that a data amount in an input queue exceeds a threshold, it will send a PAUSE frame back to the upstream switch to slow down the data forwarding speed. While PFC can effectively prevent switch packet loss, the act of traffic control by echoing a PAUSE frame may result in propagation congestion and slow down the entire network.

As described above, the current RDMA typically supports only single-path transmission. Specifically, all of RDMA messages in one RDMA connection use the same UDP source port and the same destination port. There are two major drawbacks for such single-path RDMA transmission. First, the single-path transmission is not robust to path failures, and some minor failures along the path can greatly affect the performance of upper-layer applications. Second, a single path falls short to utilize the overall network bandwidth.

The inventor realizes that the above problems can be solved by implementing multi-path RDMA (MP-RDMA) transmission. Besides, the inventor further notices that the MP-RDMA transmission may introduce a lot of challenges.

RDMA transmission is implemented in NICs, but the NIC on-chip memory is small and expensive. Installing a memory with a large capacity on the NIC may bring about occupancy of a large die space and increased power consumption, thereby causing other issues, such as heat dissipation. Thus, the on-chip memory of the NIC usually serves as cache of the host memory to store information of the RDMA connection. When a cache miss happens, the NIC needs to access the host memory to read missed data (e.g., via a Peripheral Component Interconnect express (PCIe) bus). Frequent cache misses lead to NIC throughout degradation. Thus, to avoid performance degradation caused by frequent cache misses, the memory occupancy for each path should be minimized to support more connections in an on-chip memory. However, it would be difficult to reduce the memory occupancy in the multi-path RDMA transmission.

First, multi-path transmission should track the transmission and congestion state on every path, so as to dynamically distribute network load among various paths according to the congestion condition. However, these states grow linearly with the number of paths in use.

Second, multi-path transmission may cause packets to arrive out of order at the receiving device. Consequently, the receiving device needs additional information to track whether a data packet has arrived or not. If the conditions of different paths are significantly different, the size of the additional information may be probably large.

In addition, the NIC at the receiver side may not have an enough memory to buffer out-of-order packets but has to place them into the host memory. Therefore, the data in the host memory may be updated out of order. For example, an application may use a first write operation to update a remote memory, and then issue a second write operation to set a remote flag to notify a remote application to read the updated data by the first write operation. However, if the second write operation updates the remote host memory before the first write operation, the remote application may prematurely read some of the data that has not been updated by the first write operation.

Some of the problems existing in the current RDMA transmission have been discussed above. According to the implementations of the subject matter described herein, a solution of multi-path RDMA transmission is provided to solve the above problems and one or more of other potential problems. Basic principles and several example implementations of the subject matter described herein will be described below with reference to the drawings.

Example Environment

FIG. 1 illustrates a block diagram of an example environment 100 in which implementations of the subject matter described herein can be implemented. It is to be understood that, the structure and function of the environment 100 will be described only for the purpose of illustration, without suggesting any limitation to the scope of the subject matter described herein. Implementations of the subject matter described herein are applicable to an environment of a different structure and/or function.

As shown in FIG. 1, the environment 100 may include a host 110 and a host 120.

The host 110 may include a CPU 111, a memory 112 and an NIC 3. The host 110 may be any physical computer, virtual machine, server, or the like. A user application (not shown in FIG. 1) may run on the CPU 111. The host 110 may be connected via the NIC 113 to a network 130. The host 120 may likewise include a CPU 121, a memory 122 and an NIC 123. A use application (not shown in FIG. 1) may run on the CPU 121. The host 120 may be connected via the NIC 123 to the network 130.

In the environment 110, the hosts 110 and 120 may be interconnected via the network 130. The network 130 may be for example the Ethernet or a wireless bandwidth network, etc. Particularly, as shown in FIG. 1, there may be a plurality of network paths 140-1, 140-2 . . . 140-N (collectively referred to as network paths 140 or individually referred to as a network path 140, where N>1) between the NICs 113 and 123. Though not shown in FIG. 1, it is to be understood that, in some implementations, each of the network paths 140 may include or not include an additional network device, such as a switch, a router or the like.

In some implementations, the NIC 113 and the NIC 123 may establish an RDMA connection with each other via the plurality of network paths 140, so as to enable multi-path RDMA operations between the host 110 and the host 120. For example, when the application executed by the CPU 111 initiates a request for an RDMA write operation in the host 110, the RDMA request may be sent to the NIC 113. The NIC 113 may read corresponding data from the memory 112 based on the RDMA request, and generate an RDMA message to be sent to the NIC 123. For example, the RDMA message may include data to be sent and an address in the target memory 122 to be written. The RDMA message may be transmitted to the NIC 123 via the plurality of network paths 140. In response to receiving the RDMA message transmitted from the NIC 113, the NIC 123 may directly write the corresponding data into the memory 122. As another example, when the application executed by the CPU 111 initiates a request for an RDMA read operation in the host 110, the RDMA request may be sent to the NIC 113. The NIC 113 may read corresponding data from the remote memory 122 based on the RDMA request. For example, the read data, together with an address in the target memory 112 to be written, may be included in the RDMA message. The RDMA message may be transmitted from the NIC 123 to the NIC 113 via the plurality of network paths 140. In response to receiving the RDMA message transmitted from the NIC 123, the NIC 113 may directly write the corresponding data included therein into the memory 112. The RDMA SEND/RECEIVE operation is similar to the read/write operation. That is, the NIC acting as the transmitting device may transmit the RDMA message to the NIC as the receiving device via the plurality of network paths 140, and the NIC acting as the receiving device directly writes the data in the received RDMA message into the target memory, thereby achieving zero copy data transmission between the host 110 and the host 120 without involvement of the CPU 111 and/or 121.

The example implementations of the subject matter described herein will be further described below in detail. For convenience of description, the NIC 113 will be taken as an example of the transmitting device, and the NIC 123 will be taken as an example of the receiving device. In this context, the NIC 113 acting as the transmitting device may be used interchangeably with "a first device," and the NIC 123 acting as the receiving device may be used interchangeably with "a second device."

Packet Structure

In some implementations, the NIC 113 may generate at least one packet based on an RDMA message to be transmitted from the NIC 113 to the NIC 123. For example, the NIC 113 may divide the RDMA message into at least one equal-sized field to be encapsulated in at least one UDP/IP/Ethernet packet. Then, the NIC 113 may transmit the at least one generated packet from the NIC 113 to the NIC 123 via an RDMA protocol over the plurality of paths 140.

Figure 2:
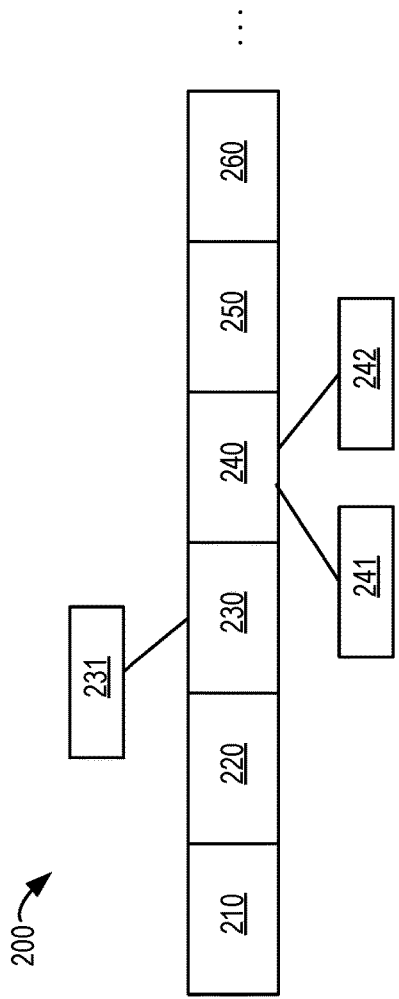
FIG. 2 is a diagram illustrating an example packet for MP-RDMA according to implementations of the subject matter described herein.

FIG. 2 is a diagram illustrating an example packet 200 for MP-RDMA transmission according to implementations of the subject matter described herein. In FIG. 2, the structure of the packet 200 transmitted from the NIC 113 to the NIC 123 will be depicted in combination of the RoCEv2 protocol. However, it is to be understood that this is only for the purpose of illustration, without suggesting any limitation to the scope of the subject matter described herein. The implementations of the subject matter described herein may also be applicable to an iWARP protocol or an InfiniBand network-based RDMA protocol. For sake of illustration, FIG. 2 only shows a header of the packet 200.

As shown in FIG. 2, in some implementations, the NIC 113 may generate the packet 200 by reusing several fields which are used in the UDP and RoCEv2 protocols. For example, the reused fields may include: an Ethernet header 210, an IP header 220, a UDP header 230, and an RoCEv2 data header 240 inserted in the UDP payload.

The UDP header 230 may include a field 231 which originally indicates a UDP source port. In some implementations, the NIC 113 may identify a network path for transmitting the packet using the field 231 (also referred to as "a first field" herein) in the packet 200. For example, the network path indicated by the field 231 may be a virtual network path (VP), which may be mapped to a respective physical path (such as one of the paths 140 as shown in FIG. 1). Typically, the packets having the same VP may be mapped to a same physical path for transmission. In some implementations, when the packet 200 is generated, the NIC 113 may determine a VP for transmitting the packet 200, and write an identifier (ID) of the VP into the field 231. For example, in an initial condition of having not received any ACK yet or while new path detection is being performed, the NIC 113 may randomly select a VP for transmitting the packet 200. Alternatively or in addition, in case that an ACK is received, the NIC 113 may determine the VP for transmitting the packet 200 based on the VP over which the ACK is received. Selection of the VP will be further described in detail in the section of "Congestion Control and Multi-Path Distribution."

The RoCEv2 data header 240 may include a PSN (referred to as "a second field" herein) of the packet 200 in the RDMA connection between the NIC 113 and the NIC 123. Besides, the RoCEv2 data header 240 may include fields 241 and 242.

In some implementations, the NIC 113 may indicate, in the field 214, whether the packet 200 is a retransmitted packet. For example, if the field 241 is '1', it may indicate that the packet 200 is a retransmitted packet; and if the field 214 is '0', it may indicate that the packet 200 is not a retransmitted packet. Retransmission of the packet will be described in detail in the section of "Packet Loss Recovery."

Alternatively or in addition, in some implementations, the NIC 113 may indicate, in a field 242 (also referred to as "a ninth field" herein), whether the packet 200 is a synchronous packet. As used herein, the "synchronous packet" refers to a packet that is not allowed to be submitted out-of-order to the target memory. For example, if the field 242 is '1', it may be indicated that the packet 200 is a synchronous packet. That is, only if a packet preceding the packet 200 (namely, the packet with a sequence number smaller than the sequence number of the packet 200) has been stored to the target memory (e.g., the memory 122), the packet 200 can be submitted to the target memory. If the field 242 is '0', it may indicate that the packet 200 is not a synchronous packet. Processing of the synchronous packet will be further described in the section of "Synchronous Packet Processing."

In some implementations, as shown in FIG. 2, the packet 200 may further include an extended field 250 (also referred to as "a third field" herein) and an extended field 260 (also referred to as "a fourth field" herein). For example, the extended field 250 may indicate a sequence number of the RDMA message to which the packet 200 belongs. The extended field 260 may indicate a sequence member of the packet 200 in the belonged RDMA message. In particular, the extended fields 250 and 260 may be used for the RDMA SEND/RECEIVE operation.

As stated above, in the case that the packet 200 is not a synchronous packet, when the NIC 123 receives the packet 200, the NIC 123 may directly store the data included in the packet 200 at a corresponding address of the memory 122. For the RDMA READ or WRITE operation, for example, since the RoCEv2 data header 240 has included a target address in the memory 122 to be written, the NIC 123 may analyze the RoCEv2 data header 240 to derive the target address, and directly store the data in the packet 200 at the target address. However, for the RDMA SEND/RECEIVE operation, the receiving device NIC 123 needs additional information to determine the target address at which the data is to be placed. For example, the target address may be included in a particular receive work queue element (WQE), and the NIC 123 may determine the particular WQE based on the field 250 in the packet 200. The NIC 123 may further determine an address offset of the packet 200 in the RDMA message.

At the receiver side, once the NIC 123 receives the packet 200 transmitted from the NIC 113, the NIC 123 may generate an ACK for the packet 200. Then, the NIC 123 may return the ACK for the packet 200 to the NIC 113 over the path where the packet 200 is received.

Figure 3:
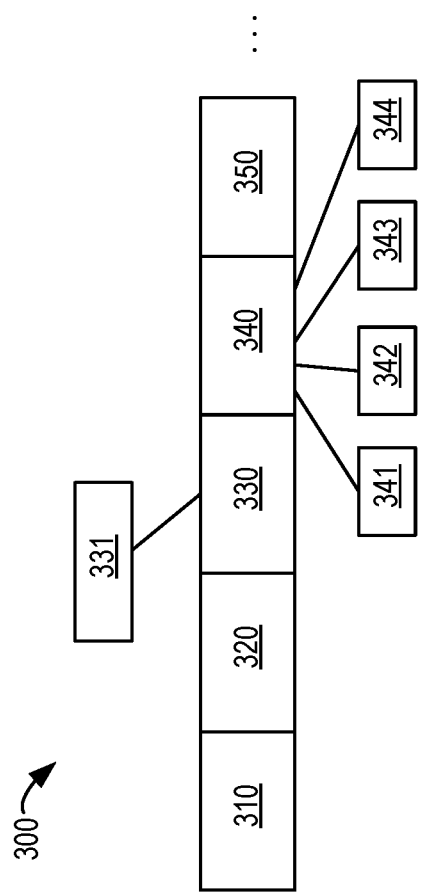
FIG. 3 is a diagram illustrating an example acknowledgement (ACK) for MP-RDMA according to implementations of the subject matter described herein.

FIG. 3 illustrates a diagram of an example ACK 300 for MP-RDMA transmission according to the implementations of the subject matter described herein. For the purpose of illustration, FIG. 3 only shows a header of the ACK 300.

As shown in FIG. 3, in some implementations, the NIC 123 may generate the ACK 300 by reusing several fields that are used in the UDP and RoCEv2 protocols. The reused fields for example may include: an Ethernet header 310, an IP header 320, a UDP header 330, and an RoCEv2 ACK header 340 inserted into the UDP payload.

The UDP header 330 may include a field 331 (also referred to as "a fifth field" herein) which originally indicates a UDP source port. In some implementations, the NIC 123 may copy the field 231 in the packet 200 to the field 331, so as to identify the network path for transmitting the ACK 300.

The RoCEv2 ACK header 340 may include a field 341 (also referred to as "a sixth field" herein) which originally used by the receiver to indicate some information to the sender, such as which packet is lost, which packet is retransmitted, which packet is received in advance, and the like. In some implementations, the NIC 123 may indicate, in the field 341, the received PSN of the packet 200. Besides, the RoCEv2 ACK header 240 may further include fields 342, 343 and 344.

In some implementations, the field 342 (also referred to as "a seventh field" herein) may be used to indicate an explicit congestion notification (indicated as "ECN" herein). For example, the ECN may be generated by a router in the transmission path of the packet 200, to indicate the congestion condition in the transmission path detected by the router. The ECN may be provided to the NIC 113 for subsequent congestion control. Application of the ECN will be further described in detail in the section of "Congestion Control and Multi-Path Distribution."

In some implementations, the NIC 123 may copy the field 241 in the packet 200 to the field 343, so as to indicate that the ACK 300 is an ACK for a retransmitted packet. Alternatively or in addition, in some implementations, the NIC 123 may copy the field 242 in the packet 200 to the field 344, so as to indicate that the ACK 300 is an ACK for a synchronous packet.

In some implementations, as shown in FIG. 3, the ACK 300 may further include an extended field 350 (also referred to as "an eighth field" herein). For example, the NIC 123 may indicate, in the extended field 350, to the NIC 113 a maximum sequential sequence number among packets received at the NIC 123. The maximum sequential sequence number indicated by the extended field 350 may be used by the NIC 113 in subsequent congestion control. Application of the maximum sequential sequence number will be further described in detail in the section of "Congestion Control and Multi-Path Distribution."

The structures of the example packet and the example ACK according to implementations of the subject matter described herein have been described above with reference to FIGS. 2 and 3. It is to be understood that this is only provided for the purpose of illustration, but not intended to limit the scope of the subject matter described herein in any manner. Implementations of the subject matter described herein may be implemented using packets and/or ACKs of different structures.

Congestion Control and Multi-Path Distribution

As described previously, MP-RDMA needs to track the transmission and congestion state for each of the plurality of paths, so as to dynamically distribute packets to various paths based on the congestion condition. In order to minimize the occupancy on the on-chip memory in the NIC, congestion control can be performed based on congestion control information for the plurality of paths at the NIC 113 acting as the transmitting device. In some implementations, the congestion control information may be represented by a unique congestion control window for the plurality of paths, which indicates for example a total number of packets that can be transmitted over the plurality of paths (hereinafter, the congestion control window is represented as "cwnd").

In an initial case that the NIC 113 has not received any ACK, cwnd may have an initial value greater than zero, for example 16. Assuming that the packet sequence number to be transmitted is numbered from 0, the NIC 113 may randomly distribute packets No. 0-15 (hereinafter referred to as the packet #0 through the packet #15) in 16 VPs, to be transmitted to the NIC 123.

When the NIC 113 receives an ACK from the NIC 123, the NIC 113 may update cwnd based on the received ACK. For example, the ACK received by the NIC 113 may have a structure as shown in FIG. 3.

In some implementations, the NIC 113 may update cwnd based on the field 342 in the ACK (i.e., ECN). For example, the NIC 113 may update cwnd according to the following equation (1):

$$cwnd \leftarrow \begin{cases} cwnd + 1/cwnd & \text{if } ECN = 0 \\ cwnd - 1/2 & \text{if } ECN = 1 \end{cases} \quad \text{Equation (1)}$$

In some implementations, the NIC 113 may further determine an available window (represented as "awnd" herein) based on the updated cwnd, and the available window may indicate a number of packets allowed to be transmitted to the NIC 123. If the determined available window is greater than 0, the NIC 113 may send a next packet over the path where the ACK is received.

In some implementations, in the absence of out-of-order reception (i.e., packets arrive at the NIC 123 sequentially in their transmission order, and ACKs for the packets also arrive at the NIC 113 sequentially in their transmission order), the NIC 113 may determine the awnd according to the following equation (2):

$$awnd = cwnd - (snd\_next - snd\_una) \quad \text{Equation (2)}$$

where snd_next indicates a sequence number of a next packet to be transmitted by the NIC 113, snd_una indicates a minimum sequence number among packets for which ACKs have not been received. That is, snd_next−snd_una can indicate a number of packets that the NIC 113 has transmitted but has not received their ACKs.

For example, assuming that an initial cwnd is 16 and the NIC 113 has transmitted the packet #0 through the packet #15 to the NIC 123, snd_next=16 and snd_una=0. At this time, the NIC 113 receives the ACK for the packet #0 (represented as "ACK #0" herein) from the NIC 123, the ECN in the ACK #0 is 0, and thus, the cwnd is updated as 16+1/16 and the snd_una is updated as 1. Accordingly, awnd=16+1/16−(16−1)=1+1/16. Since awnd is greater than 0, the NIC 113 may transmit the packet #16 to the NIC 123 over the path where the ACK #0 is received.

Alternatively, in some implementations, considering the possible out-of-order reception (i.e., the packets may not arrive at the NIC 123 in their transmission order, and ACKs for the packets may not arrive at the NIC 113 in their transmission order either), the NIC 113 may determine the awnd according to the equation (3):

$$awnd = cwnd + inflate - (snd\_next - snd\_una) \quad \text{Equation (3)}$$

where snd_next represents a sequence number of a next packet to be transmitted by the NIC 113, snd_una indicates a minimum sequence number among the packets for which ACKs have not been received. That is, snd_next−snd_una may represent a number of packets that the NIC 113 has transmitted but has not received their ACKs. In addition, inflate represents an expansion coefficient for the available window awnd, which estimates a number of out-of-order data packets that the NIC 123 has received (for example, the NIC 113 has received ACKs for these out-of-order data packets). The number of these packets may be added to the available window awnd, so as to send the packets as many as possible. inflate can be computed in the following manner: increment inflate for each received ACK; then, prior to updating snd_una based on the ACK, subtracting (ack_aack−snd_una) from the incremented inflate, where ack_aack represents a value of the field 350 in the ACK (for example, in practice, it may be equal to a sum of the maximum sequence number among the packets received at the NIC 123 and 1).

For example, assuming that the initial cwnd is 16, the NIC 113 has transmitted the packet #0 through the packet #15 to the NIC 123. At this time, snd_next=16, snd_una=0 and inflate=0. Then, the NIC 113 receives the ACK #1 for the packet #1 from the NIC 123. The ECN in the ACK #1 is 0 and ack_aack is 0 (because the ACK #0 preceding the ACK #1 has not been received), and thus cwnd is updated as 16+1/16. Further, inflate is firstly incremented by 1, and then (ack_aack−snd_una) is subtracted therefrom. Thus, the updated inflate is 1, indicating that the NIC 123 has received one out-of-order data packet, namely the packet #1. According to the equation (3), awnd=16+1/16+1−(16−0)=1+1/16. As awnd is greater than 0, the NIC 113 may transmit the packet #16 to the NIC 123 over the path where the ACK #1 is received, and snd_next is updated as 17. Assuming that the NIC 113 further receives the ACK #2 for the packet #2 from the NIC 123, and its ECN is 0. According to the above rule, inflate will be updated as 2, and awnd=16+1/8+2−(17−0)=1+1/8. As awnd is greater than 0, the NIC 113 may transmit the packet #17 to the NIC 123 over the path where the ACK #2 is received, and snd_next is updated as 18.

It can be seen that, the implementations of the subject matter described herein can appropriately balance packet traffic among a plurality of paths. Meanwhile, since only one congestion control window is used to perform congestion control on the plurality of paths, the implementations of the subject matter described herein can minimize the occupancy on the on-chip memory of the NIC.

Burst Control

In some implementations, for a returned ACK, the NIC 113 may transmit more than one packet. For example, when the determined available window awnd is greater than 1, the NIC 113 may transmit more than one packet. In some cases, if more than one packet is transmitted over a single path where the ACK is received, the congestion may probably occur or deteriorate. In some implementations, in order to solve the above problem, a threshold may be predetermined for a burst of packets. For example, the predetermined threshold indicates a maximum number of packets allowed to be transmitted at one time over a single path. If the NIC 113 determines that the number of packets allowed to be transmitted to the NIC 123 exceeds the predetermined threshold, the MC 113 may only transmit the predetermined number of packets over the single path where the ACK is received. Transmission of the remaining packets will be triggered by an ACK received subsequently.

In some cases, if no subsequent ACK is incoming, the remaining packets may have no chance to be sent. In some implementations, a timer may be set for these remaining packets. For the example, the timeout period of the timer may be set to be half of a round-trip delay between the NIC 113 and the NIC 123 (represented as "RTT" herein). If the timer expires but does not receive the subsequent ACK, the remaining packets may be transmitted over random paths, respectively.

Congestion Control Window Shrinkage

In some implementations, if no data is to be transmitted, the NIC 113 may gradually shrink the congestion control window cwnd. For example, if the NIC 113 receives an ACK for triggering transmission of a next packet but there is no data to be transmitted, the NIC 113 may decrement cwnd by 1, so as to correspondingly reduce the transmission rate over the plurality of paths, thereby saving network resources. Moreover, in some implementations, if the time period for which shortage of data to be transmitted by the transmitter lasts exceeds a predetermined threshold (e.g. three times as long as RTT), the congestion control window and related states may be reset, i.e., may return to the initial condition. In the manner, the congestion control window can accurately reflect the current congestion condition over the plurality of paths.

New Path Detection

As described above, in the initial condition, the NIC 113 may randomly select a path for packet transmission. In the case that an ACK is received, the NIC 113 may select a path for transmitting a subsequent packet based on the path receiving the ACK. Alternatively or in addition, in some implementations, the NIC 113 may also actively detect a new path based on a predetermined probability. For example, the NIC 113 may periodically send a packet over a new random path based on a predetermined packet interval, rather than always determining the path for transmitting a packet based on a received ACK. Since it is unnecessary to perform the congestion control for each path, implementations of the subject matter described herein allow multiple paths to be used simultaneously, without incurring additional memory footprint. In addition, by periodically detecting the new path and dropping the slow path as discussed above, MP-RDMA according to the implementations of the subject matter described herein can always perform the RDMA transmission over an optimum path, thereby further increasing the throughout and reduce the transmission latency.

Out-of-Order Handling

As described above, due to the parallelism of multi-path transmission, the case that the data packets arrive at the receiving device out of order may occur. If the data packets arrive at the receiver side out of order, the NIC at the receiver side may not have sufficient memories to buffer the out-of-order data packets. Implementations of the subject matter described herein can control the out-of-order degree of MP-RDMA to an acceptable level, so as to minimize occupancy on the on-chip memory of the NIC.

Out-of-Order Handling at the Receiver Side

Figure 4:
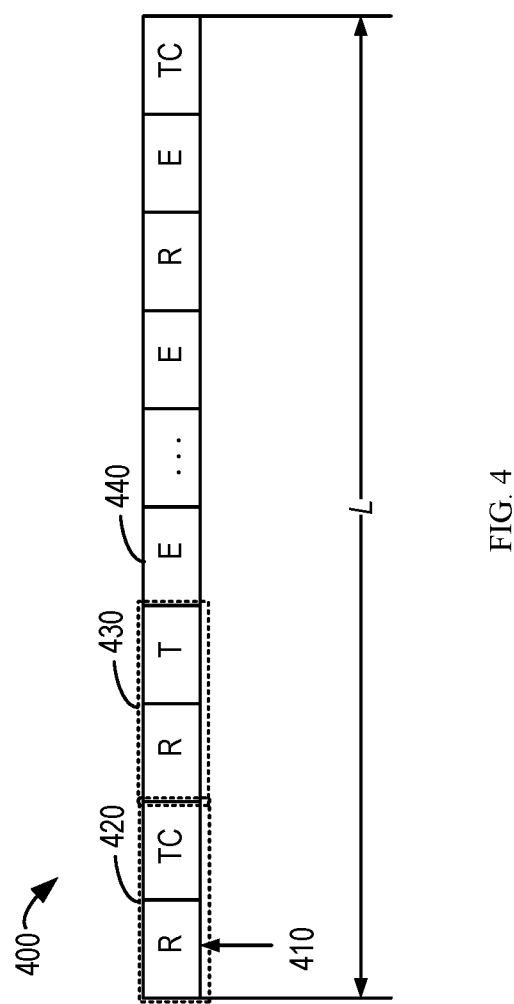
FIG. 4 is a diagram illustrating an example data structure for tracking the received packets according to implementations of the subject matter described herein.

In some implementations, a bitmap data structure may be used at the NIC 123 acting as the receiver side to track arrived packets. FIG. 4 is a diagram illustrating an example bitmap data structure 400 for tracking the received packets according to implementations of the subject matter described herein. As shown in FIG. 4, the bitmap 400 may be organized into a circular array. For example, the bitmap 400 may have L slots, for example, each of which may include two bits for recording a state of a packet. A header 410 of the bitmap 400 corresponds to a packet with a sequence number rcv_next, rcv_next indicates a sequence number of a next packet desired to be received by the receiving device. That is, the bitmap 400 may record states of packets with sequence numbers ranging from rcv_next to rcv_next+L−1.

In some implementations, according to a type of the RDMA message (for example, the type is included in the RoCEv2 ACK header 240 as shown in FIG. 2), each packet may be in one of the four following states: 1) "Empty" (denoted as "E" in FIG. 4), indicating that the packet has not been received yet; 2) "Received" (denoted as "R" in FIG. 4), indicating that the packet has been received; 3) "Tail" (denoted as "T" in FIG. 4), indicating that the packet has been received and the packet is the last packet of the RDMA message; and 4) "Tail with completion" (denoted as "TC" in FIG. 4), indicating that the packet has been received and is the last packet of the RDMA message, and the RDMA message needs a completion notification. The initial state of each slot in the bitmap 400 may be set at the "Empty" state.

In response to receiving a packet from the NIC 113, the NIC 123 may determine whether the bitmap 400 contains a slot corresponding to the packet based on the PSN of the packet (e.g. it is included in the RoCEv2 ACK header 240 as shown in FIG. 2). For example, if the PSN of the packet is less than rcv_next+L, the NIC 113 may determine that the bitmap 410 contains a slot corresponding to the packet. Otherwise, the NIC 113 may determine that the bitmap 410 does not contain a slot corresponding to the packet. If the bitmap 400 contains a slot corresponding to the packet, the NIC 113 may update the state of the packet at the slot corresponding to the packet.

In some implementations, the NIC 113 may determine, based on the field 250 as shown in FIG. 2 in the packet, whether the received packet is the last packet of the RDMA message. If the packet is not the last packet of the RDMA message, the state of the packet may be updated as the "Received" state. If the packet is the last packet of the RDMA message, the NIC 113 may further examine the message type field in the RoCEv2 ACK header 240 to determine whether the RDMA message needs a completion notification. For example, if the RDMA message indicates that the RDMA operation is a READ operation or SEND operation, the NIC 113 may determine that the packet needs a completion notification, and thus the state of the packet is updated as "Tail with completion." Otherwise, the NIC 113 may update the state of the packet as the "Tail" state.

In some implementations, the NIC may continuously scan the bitmap 400, to determine whether the RDMA message is completely received. For example, a completely received RDMA message may be indicated by a plurality of continuous slots marked as the "Received" state together with a slot marked as the "Tail with completion" or "Tail" state, such as the messages 420 and 430 as shown in FIG. 4. If the NIC 113 determines that the RDMA message has been completely received, the NIC 113 may set the state of the slot corresponding to the RDMA message as the "Empty" state, and update rcv_next to move a pointer 410 pointing to the header of the circular array 400 to a slot 440 after the message, and the states of the slots corresponding to the messages 420 and 430 may be set as "E", such that these slots may be used to record states of packets arriving subsequently. In addition, if the message needs a completion notification (e.g. the message 420), the NIC 113 may pop the WQE from the receive work queue and generate the corresponding CQE in the CQ.

Out-of-Order Handling at the Transmitter Side

The out-of-order handling performed at the receiver side has been discussed above. As stated above, in order to decrease occupancy on the on-chip memory of the NIC at the receiver side, the size of the bitmap (namely L) for tracking the states of the received packets may be limited. That is, if the PSN of a packet received by the NIC 123 exceeds rcv_next+L, the state of the packet cannot be recorded in the bitmap. If the NIC 123 discards the packet for this reason, it will compromise the overall performance. The implementations of the subject matter described herein can control the out-of-order degree of MP-RDMA to an acceptable level by path selection at the transmitter side, thereby solving the above problem.

In some implementations, if the NIC 113 acting as the transmitting device receives an ACK from the NIC 123, the NIC 113 may determine the maximum packet sequence number among the packets for which ACKs having been received (which is represented as "snd_ooh" herein). The NIC 113 may determine, based on snd_ooh and a predetermined out-of-order tolerance for MP-RDMA (as used herein, the out-of-order tolerance is represented as "Δ"), a threshold sequence number of a packet allowed to be transmitted over the path where an ACK is received. For example, the threshold sequence number snd_ooh may be determined according to the following equation (4):

$$snd\_ool = snd\_ooh - \Delta \qquad \text{equation (4)}$$

where Δ≤L. If the NIC 113 determines that the sequence number of the packet in connection with the ACK (for example, indicated by the field 341 as shown in FIG. 3) is less than the threshold sequence number snd_ooh, the NIC 113 may avoid transmitting the next packet over the path receiving the ACK by updating the congestion control the window cwnd (for example, decrementing cwnd).

It can be seen from the above description that, implementations of the subject matter described herein utilize snd_ooh to mark an out-of-order packet that arrives at the receiving device earlier through a quick path. In order to control the out-of-order degree of MP-RDMA, it is necessary to drop a slow path which causes the out-of-order degree to exceed the predetermined threshold Δ. if the PSN of the packet in connection with the ACK is less than snd_ooh, it identifies such a slow path. By preventing sending a subsequent packet over the slow path, implementations of the subject matter described herein can control the out-of-order degree of MP-RDMA to an acceptable level.

It should be noted that packet retransmission is not taken into consideration in the above description. Since the sequence number of a retransmitted packet may be probably less than snd_ooh, the PSN of the packet in connection with the ACK may be unable to identify the slow path in the case of packet retransmission. Therefore, in some implementations, the above operations may not be performed for the ACK with a retransmission tag (for example, which is indicated by the field 342 as shown in FIG. 3). That is, the path receiving an ACK for a retransmitted packet always may always be treated as a normal path, and the ACK for the transmitted packet can trigger transmission of the next packet over the path. Processing of a retransmitted packet will be further described below in detail.

Synchronous Packet Processing

As described above, since the NIC 123 may not have sufficient memory to buffer the data packets arriving out of order, it may have to store at least a part of the data packets in the host memory 122. Therefore, the update of data in the memory 122 may be performed out of order. For common operations, such out-of-order updating may be acceptable. However, for some operations depending on a specific transmission order (herein referred to as "synchronous operations"), the out-of-order updating may result in that an application may be unable to retrieve the desired correct data. Implementations of the subject matter described herein can defer the synchronous operation for a specified time interval to solve the above problem.

As described with reference to FIG. 2, the NIC 113 may use the field 242 in the packet to indicate whether the packet is a synchronous packet, i.e., which is not allowed to be submitted out of order to the target memory. In some implementations, the NIC 113 may determine a time interval Δt for transmitting a synchronous packet. For example, the NIC 113 may determine Δt according to the following equation (5):

$$\Delta t = \alpha \cdot \Delta / R_s = \alpha \cdot \Delta / \left( \frac{cwnd}{RTT} \right) \qquad \text{equation (5)}$$

where Δ represents a predetermined out-of-order tolerance for MP-RDMA, RTT represents a pre-estimated round-trip delay between the NIC 113 and the NIC 123, α represents a predetermined adjustable coefficient, and $R_s$ represents a transmission rate on the RDMA connection.

In some implementations, at the transmitter side, the NIC 113 has to wait at least for a time interval Δt to transmit a synchronous packet since a packet preceding the synchronous packet is transmitted. In this manner, the packet preceding the synchronous packet may arrive at the receiver side earlier than the synchronous packet with a relatively large probability.

In some implementations, at the receiver side, when the NIC 123 receives a packet with a synchronous tag (for example, indicated by the field 242 as shown in FIG. 2), the NIC 123 will first determine whether the packet with a sequence number smaller than the sequence number of the synchronous packet has been submitted to the memory 122. Only if all of the packets with sequence numbers smaller than the sequence number of the synchronous packet have been submitted to the memory 122, the synchronous packet can be submitted to the memory 122. In this way, implementations of the subject matter described herein can ensure the operations depending on a specified transmission sequence are performed in order.

Packet Loss Recovery

For a traditional single-path RDMA, packet loss can be detected by discontinuity of the PSNs of the received packets. However, in MP-RDMA, it is common that the packets arrive out of order, and most of the cases are not related to the packet loss. Regarding the above problem, implementations of the subject matter described herein can identify and recover real packet loss.

Figure 5:
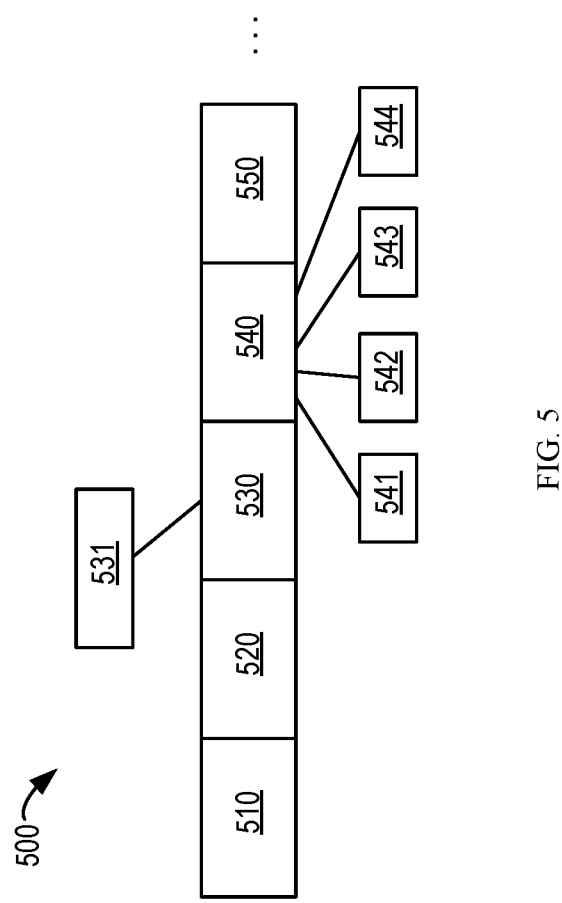
FIG. 5 is a diagram illustrating an example negative acknowledgement (NACK) for MP-RDMA according to implementations of the subject matter described herein.

In some implementations, when the PSN of a packet that the NIC 123 acting as the receiving device receives exceeds rcv_next+L, the NIC 123 may generate a negative acknowledgement (NACK) and transmit it to the NIC 113. The structure of the NACK is similar to the structure of the ACK as shown in FIG. 3. For example, FIG. 5 is a diagram of an example NACK 500 for MP-RDMA transmission according to some implementations of the subject matter described herein. For sake of illustration, FIG. 5 only shows a header of the NACK 500.

As shown in FIG. 5, the NACK 500 may include: an Ethernet header 510, an IP header 520, a UDP header 530, and a ROCEv2 NACK header 540 inserted in the payload of the UDP. Unlike the RoCEv2 ACK header 340 as shown in FIG. 3, the RoCEv2 ACK header 340 includes a tag indicating an acknowledgement, while the RoCEv2 NACK header 540 contains a corresponding tag indicating a negative acknowledgement. Besides, the NACK 500 further includes fields 541, 542, 543, 544 and 550 which respectively correspond to the fields 341, 342, 343, 344 and 350 in the ACK 300 as shown in FIG. 3. In some implementations, the fields 543 and 544 may be populated similar to the fields 342 and 350 respectively, while the fields 543 and 544 can optionally not be populated. Unlike the field 341, the field 541 may be filled with the sequence number of a packet to be retransmitted. For example, the NIC 123 may scan the bitmap 400 sequentially from the header pointer of the bitmap 400 as shown in FIG. 4, and fill the sequence number of the packet in the state "E", as obtained earliest by scanning, into the field 541.

Figure 6:
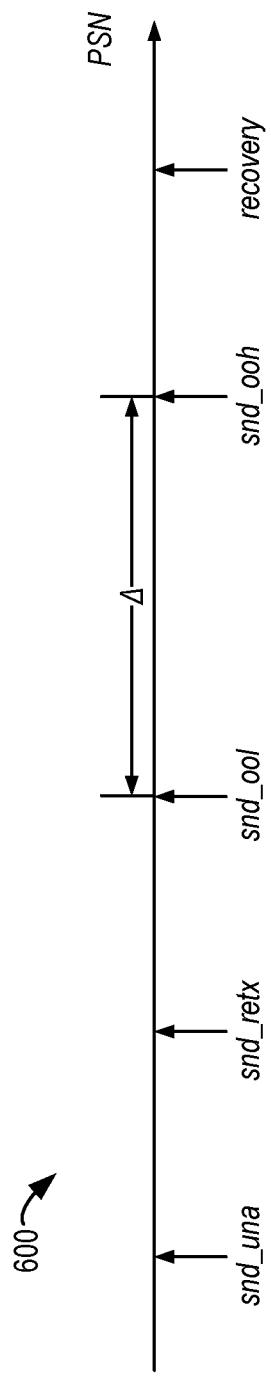
FIG. 6 is a diagram illustrating a plurality of pieces of control information for MP-RDMA according to implementations of the subject matter described herein.

In some implementations, in response to receiving the NACK from the NIC 123, the NIC 113 may enter in a packet loss recovery mode. In response to entering in the packet loss recovery mode, the NIC 113 may determine respective values of two variables recovery and snd_retx, where snd_retx indicates the start of the sequence number among the packets to be retransmitted, and recovery indicates the end of the sequence number among the packets to be retransmitted. For example, the NIC 113 may determine the value of recovery based on snd_next which indicates the sequence number of the next packet to be transmitted currently, and determine the value of snd_next based on the value of the field 541 in the NACK 500. FIG. 6 illustrates a diagram of a plurality of pieces of control information according to some implementations of the subject matter described herein. FIG. 6 schematically illustrates the correlation between the information recovery and snd_retx for the packet loss recovery mode and several pieces of information for path selection described previously.

In some implementations, upon entering in the packet loss recovery mode, in response to receiving an ACK from the NIC 123, the NIC 113 may retransmit the packet indicated by the snd_retx, over the path receiving the ACK, nstead of a new packet. For example, the retransmitted packet may carry a retransmission tag (i.e., the field 241 thereof as shown in FIG. 2 is set as '1"). The NIC 113 may update snd_next and snd_una correspondingly. When the value of snd_una is greater than the value of recovery, i.e., when all of the packets to be transmitted are transmitted, the packet loss recovery mode is terminated.

When the NIC 123 receives a packet with a retransmission tag, it may include the retransmission tag in the ACK for the packet, and transmit the ACK carrying the retransmission tag to the NIC 113. In some implementations, for an ACK with the retransmission tag, the NIC 113 may not perform path selection as shown in the equation (3) or (4). That is, the NIC 113 may always treat the path receiving the ACK for the retransmitted packet as a normal path, and the ACK for the retransmitted packet can always trigger transmission of a next packet (e.g., retransmitted packet or non-retransmitted packet) over the path.

As stated above, transmission of a NACK may be triggered in response to the NIC 123 receiving a packet with the sequence number greater than the rcv_nex+1. In some cases, if packet loss occurs but the transmitter does not have sufficient subsequent data for transmission, the packet loss recovery mode may not be triggered. In some implementations, in order to avoid this case, when the congestion control window allows transmission of a next packet but the NIC 113 does not have sufficient data to be transmitted, the NIC 113 may actively retransmit the packet for which the ACK has not been received, so as to trigger the packet loss recovery mode as early as possible.

In conclusion, the solution for MP-RDMA according to implementations of the subject matter described herein can efficiently utilize rich network paths while maintaining low memory occupancy. By triggering transmission of packets over multiple paths based on the ACKs and performing out-of-order aware path selection, the solution can select optimum network paths and distribute appropriately the packets over these paths for transmission. No matter how many network paths are used, the solution only needs to occupy a small amount of additional memory space in the NIC. Besides, the MP-RDMA solution according to the implementations of the subject matter described herein can deal with the PFC in the network well. With the congestion control solution in accordance with the implementations of the subject matter described herein, the PFC will rarely be triggered. If the PFC is triggered and if the PFC terminates all the network paths, MP-RDMA will also stop transmission as well, since there will be no returned ACK. If the PFC is restored, MP-RDMA will resume execution. If the PFC terminates a part of the paths, these terminated paths will generate longer delays than other paths, and the path selection solution in accordance with the implementations of the subject matter described herein can efficiently eliminate these slow paths. Therefore, the solution for MP-RDMA transmission according to the subject matter described herein can improve robustness against path failures and efficiently utilize the entire network bandwidth.

Example Processes

Figure 7:
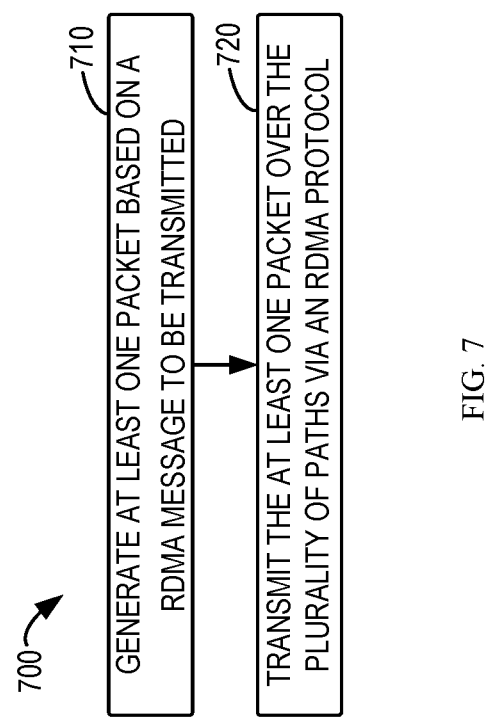
FIG. 7 is a flowchart of a process for MP-RDMA according to some implementations of the subject matter described herein.

FIG. 7 is a flowchart of a process for MP-RDMA according to some implementations of the subject matter described herein. The process 700 may be implemented by a NIC acting as a transmitting device among the NIC 113 and the NIC 123. In the following, the NIC 113 will be taken as an example of the transmitting device, while the NIC 123 will be taken as an example of the receiving device. For example, the process 700 may be implemented at the NIC 113.

As shown in FIG. 7, at 710, at least one packet including at least a first packet is generated based on a RDMA message to be transmitted from the NIC 113 to the NIC 123. The NIC 113 has a RDMA connection with the NIC 123 via a plurality of paths. The first packet at least includes a plurality of fields, which include information for transmitting the first packet over the first path of the plurality of paths. That is, the information in the plurality of fields will be used to support or allow transmission of the first packet over the first path. At 720, the at least one packet is transmitted to the NIC 123 over the plurality of paths via an RDMA protocol, where the first packet is transmitted over the first path.

In some implementations, the plurality of fields include: a first field indicating an identifier of the first path; a second field indicating a packet sequence number of the first packet; a third field indicating a message sequence number of the RDMA message; and a fourth field indicating a sequence number of the first packet in the RDMA message.

In some implementations, the NIC 113 transmits the at least one packet by: obtaining congestion control information indicating a congestion condition of the plurality of paths; determining, based on the congestion control information, whether the first packet is allowed to be transmitted; and in response to determining that the first packet is allowed to be transmitted, transmitting the first packet to the NIC 213 over the first path via the RDMA protocol.

In some implementations, the at least one packet further includes a second packet subsequent to the first packet, and the NIC 113 transmits the at least one packet by: in response to receiving a first acknowledgement for the first packet from the NIC 123 over the first path, updating the congestion control information; and controlling transmission of the second packet based on the updated congestion control information.

In some implementations, the first acknowledgement at least includes: a fifth field indicating an identifier of the first path; a sixth field indicating the packet sequence number of the first packet received by the NIC 123; a seventh field indicating a congestion notification generated by a packet forwarding device on the first path, the congestion notification indicating a congestion condition of the first path detected by the packet forwarding device; and an eighth field indicating a maximum sequential sequence number among packets received at the NIC 123.

In some implementations, the NIC 113 updates the congestion control information by: in response to receiving the first acknowledgement, updating the congestion control information at least based on the congestion notification indicated by the seventh field and the maximum sequential sequence number indicated by the eighth field.

In some implementations, the NIC 113 updates the congestion control information by: in response to receiving the first acknowledgement, determining a maximum packet sequence number among packets for which acknowledgements have been received; determining an out-of-order tolerance for transmission of the at least one packet; determining, based on the maximum packet sequence number and the out-of-order tolerance, a threshold sequence number of a packet allowed to be transmitted over the first path; and updating the congestion control information at least based on the packet sequence number indicated by the sixth field and the threshold sequence number.

In some implementations, the first packet further includes a ninth field indicating a transmission sequence on which the first packet depends. The NIC 113 transmits the at least one packet by: determining, at least based on the congestion control information and the out-of-order tolerance, a time interval for transmitting the first packet; and in response to a third packet immediately preceding the first packet in the at least one packet being transmitted, waiting at least for the time interval to transmit the first packet.

In some implementations, the process 700 further comprises: in response to receiving a negative acknowledgement from the NIC 123, determining a fourth packet in connection with the negative acknowledgement from the at least one packet; processing the fourth packet by adding a retransmission tag to the fourth packet; and retransmitting the processed fourth packet to the NIC 123 over a second path of the plurality of paths via the RDMA protocol, over which an acknowledgement has been received.

Figure 8:
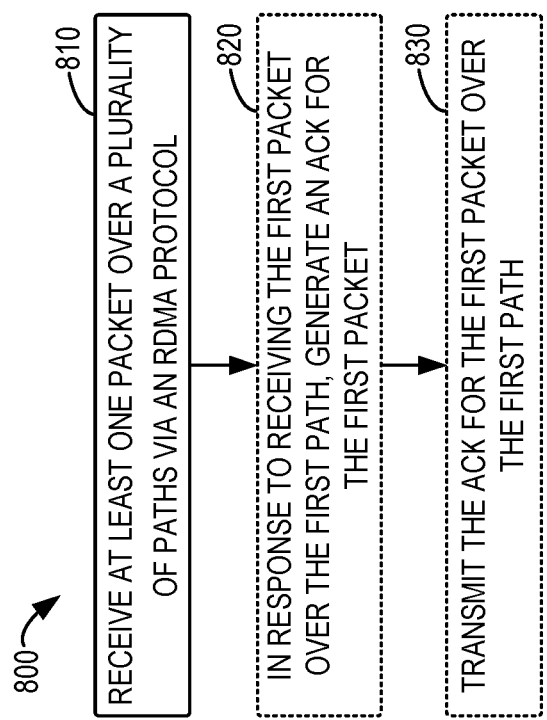
FIG. 8 is a flowchart of a process for MP-RDMA according to some implementations of the subject matter described herein.

FIG. 8 is a flow chart of a process for MP-RDMA according to some implementations of the subject matter described herein. The process 800 may be implemented by a NIC acting as a receiving device among the NIC 113 and the NIC 123. In the following, the NIC 113 will be taken as an example of the transmitting device, and the NIC 123 will be taken as an example of the receiving device, while the NIC 113 will be taken as an example of the transmitting device. For example, the process 800 may be implemented at the NIC 123.

As shown in FIG. 8, at 810, at least one packet including at least one packet is received from the NIC 113 over a plurality of paths via an RDMA protocol at the NIC 123. The NIC 113 has an RDMA connection with the NIC 123 via a plurality of paths. The at least one packet includes at least a plurality of fields, which include information for transmitting the first packet over a first path of the plurality of paths. That is, the information in the plurality of fields will be used to support or allow transmission of the first packet over the first path.

In some implementations, the at least one packet is generated based on an RDMA message, and the plurality of fields include: a first field indicating an identifier of the first path; a second field indicating a first packet sequence number of the first packet; a third field indicating a message sequence number of the RDMA message; and a fourth field indicating a sequence number of the first packet in the RDMA message.

Alternatively or in addition, at 820, in response to receiving the first packet over the first path, a first acknowledgement for the first packet is generated at the NIC 123. The first acknowledgement at least includes: a fifth field indicating the identifier of the first path; a sixth field indicating the first packet sequence number of the first packet received at the device 123; a seventh field indicating a congestion notification generated by a packet forwarding device on the first path, the congestion notification indicating a congestion condition of the first path detected by the packet forwarding device; and an eighth field indicating a maximum sequence number among packets received at the NIC 123. At 830, the first acknowledgement is transmitted to the NIC 113 over the first path.

In some implementations, the process 800 further comprises: obtaining a bitmap for recording a state of a received packet; in response to receiving the first packet over the first path, determining whether a location corresponding to the first packet is present in the bitmap; and in response to determining the location corresponding to the first packet is present in the bitmap, updating a state associated with the first packet at the location.

In some implementations, the process 800 further comprises: in response to determining that the location corresponding to the first packet is absent in the bitmap, determining a packet to be retransmitted based on the bitmap; generating a negative acknowledgement indicating the packet to be retransmitted; and transmitting the negative acknowledgement to the NIC 113 over the first path.

In some implementations, the process 800 further comprises: in response to the bitmap indicating that the at least one packet associated with the RDMA message has been received, clearing a respective location corresponding to the at least one packet in the bitmap so as to record a state of a packet associated with another RDMA message.

In some implementations, the process 800 further comprises: in response to receiving a second packet including a retransmission tag over a second path of the plurality of paths via the RDMA protocol, generating a second acknowledgement for the second packet by adding the retransmission tag to the second acknowledgement; and transmitting the second acknowledgement to the NIC 113 over the second path.

In some implementations, the process 800 further comprises: in response to receiving the first packet, determining an address for storing the first packet in the memory 122; and storing the first packet at the address.

In some implementations, the first packet further includes a ninth field indicating a transmission sequence on which the first packet depends, and the NIC 123 stores the first packet at the address by: in response to a third packet with a second packet sequence number having been stored in the target memory, storing the first packet at the address, the second packet sequence number being below the first packet sequence number.

Example Device

Figure 9:
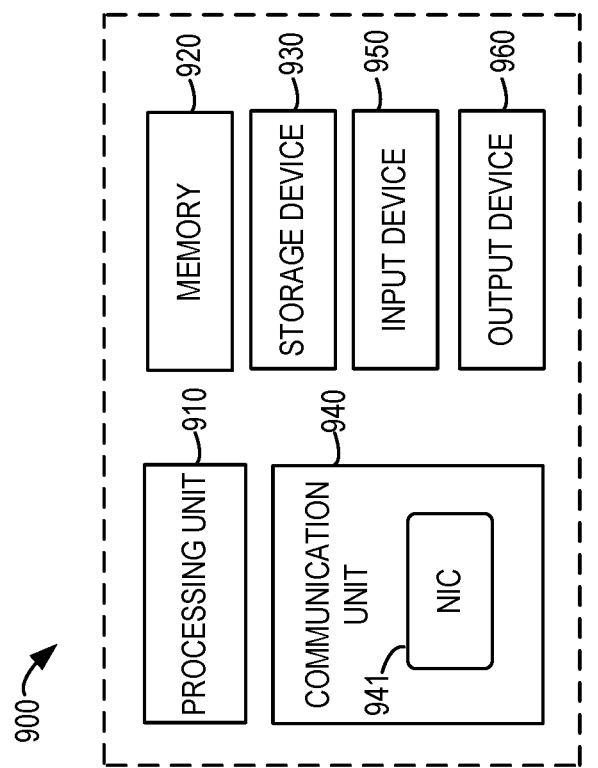
FIG. 9 is a block diagram of a computer device in which implementations of the subject matter described herein can be implemented.

FIG. 9 is a block diagram of a computing device 900 that can implement a plurality of implementations of the subject matter described herein. For example, the computer device 900 may be used to implement the hosts 110 and 120 as shown in FIG. 1. It is to be understood that the computer device 900 as shown in FIG. 9 is merely exemplary, but should not be construed as limiting the function and scope of the implementations of the subject matter described herein. As shown in FIG. 9, the computing device 900 includes a computing device in form of a general computing device. Components of the computing device 900 may include, but are not limited to, one or more processors or processing units 910, a memory 920, a storage device 910, a memory 920, a storage device 930, one or more communication units 940, one or more input devices 950, and one or more output devices 960.

In some implementations, the computing device 900 may be implemented as various user terminals or service terminals with computing capabilities. The service terminals may be servers, large-scale computing devices, or the like, provided by various service providers. The user terminal may be a mobile terminal, a fixed terminal or a portable terminal of any type, including a mobile phone, a multimedia computer, a multimedia tablet, an Internet node, a communicator, a desktop computer, a laptop computer, a notebook computer, a personal communication system (PCS) device, a personal navigation device, a personal digital assistant (PDA), a digital camera/video camera, a positioning device, a game device, or any combination of the above, including accessories and peripherals of these devices or any combination thereof.

The processing unit 910 can be a physical or virtual processor and can execute various processes based on the programs stored in the memory 920. In a multi-processor system, multiple processing units execute computer-executable instructions in parallel to improve the parallel processing capacity of the computing device 900. The processing unit 910 may also be called a central processing unit (CPU), a microprocessor, a controller, or a microcontroller.

The computing device 900 typically includes a plurality of computer storage media. Such media can be any available media accessible by the computing device 900, including but not limited to volatile and non-volatile media, and removable and non-removable media. The memory 920 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof.

The storage device 930 can be any removable or non-removable media and may include machine-readable media which can be used for storing information and/or data and accessed in the computing device 930. The computing device 900 may further include additional removable or non-removable, volatile/non-volatile media. Although not shown in FIG. 9, there may provide a disk drive for reading or writing a removable, non-volatile disk and a CD-ROM drive for reading or writing a removable, non-volatile CD. In these cases, each drive may be connected to a bus (not shown) via one or more data medium interfaces.

The communication unit 940 implements communication with a further computing device via a communication medium. The communication unit 940 may include an NIC 941 for which MP-RDMA according to the implementations of the subject matter described herein is enabled. The NIC 941 enables the computing device 900 to perform MP-RDMA transmission with the further computing device via a communication medium. For example, when the computing device 900 acts as the host 110 shown in FIG. 1, the NIC 941 may serve as the NIC 113 shown in FIG. 1; while when the computing device 900 acts as the host 120 shown in FIG. 1, the NIC 814 may serve as the NIC 123 shown in FIG. 1.

Additionally, functions of components in the computing device 900 can be implemented by a single computing cluster or multiple computing machines connected communicatively for communication. Therefore, the computing device 900 can be operated in a networking environment using a logical link with one or more other servers, network personal computers (PCs) or another general network node.

The input device 150 may include one or more input devices, such as a mouse, keyboard, tracking ball, voice-input device, and the like. The output device 160 may include one or more output devices, such as a display, loudspeaker, printer, and the like. As required, the computing device 900 can also communicate with one or more external devices (not shown) such as a storage device, display device and the like. Such communication is performed via an input/output (I/O) interface (not shown).

Example Implementations

Some example implementations of the subject matter described herein are provided below.

In a first aspect, the subject matter described herein provides a device. The device comprises: a processing unit; and a memory coupled to the processing unit and storing instructions for execution by the processing unit, the instructions, when executed by the processing unit, causing the device to perform actions. The actions comprise: generating at least one packet including at least a first packet based on a remote direct memory access (RDMA) message to be transmitted from the device to another device, the device having an RDMA connection with the other device via a plurality of paths, the first packet including at least a plurality of fields, the plurality of fields including information for transmitting the first packet over a first path of the plurality of paths; and transmitting the at least one packet to the other device over the plurality of paths via an RDMA protocol, the first packet being transmitted over the first path.

In some implementations, the plurality of fields include: a first field indicating an identifier of the first path; a second field indicating a packet sequence number of the first packet; a third field indicating a message sequence number of the RDMA message; and a fourth field indicating a sequence number of the first packet in the RDMA message.

In some implementations, transmitting the at least one packet comprises: obtaining congestion control information indicating a congestion condition of the plurality of paths; determining, based on the congestion control information, whether the first packet is allowed to be transmitted; and in response to determining that the first packet is allowed to be transmitted, transmitting the first packet to the other device over the first path via the RDMA protocol.

In some implementations, the at least one packet further includes a second packet subsequent to the first packet, and transmitting the at least one packet comprises: in response to receiving a first acknowledgement for the first packet from the other device over the first path, updating the congestion control information; and controlling transmission of the second packet based on the updated congestion control information.

In some implementations, the first acknowledgement at least includes: a fifth field indicating the identifier of the first path; a sixth field indicating the packet sequence number of the first packet; a seventh field indicating a congestion notification generated by a packet forwarding device on the first path, the congestion notification indicating a congestion condition of the first path detected by the packet forwarding device; and an eighth field indicating a maximum sequential sequence number among packets received at the other device.

In some implementations, updating the congestion control information comprises: in response to receiving the first acknowledgement, updating the congestion control information at least based on the congestion notification indicated by the seventh field and the maximum sequential sequence number indicated by the eighth field.

In some implementations, updating the congestion control information comprises: in response to receiving the first acknowledgement, determining a maximum packet sequence number among packets for which acknowledgements have been received; determining an out-of-order tolerance for transmission of the at least one packet; determining, based on the maximum packet sequence number and the out-of-order tolerance, a threshold sequence number of a packet allowed to be transmitted over the first path; and updating the congestion control information at least based on the packet sequence number indicated by the sixth field and the threshold sequence number.

In some implementations, the first packet further includes a ninth field indicating a transmission sequence on which the first packet depends, and transmitting the at least one packet comprises: determining, at least based on the congestion control information and the out-of-order tolerance, a time interval for transmitting the first packet; and in response to a third packet immediately preceding the first packet in the at least one packet being transmitted, waiting at least for the time interval to transmit the first packet.

In some implementations, the actions further comprise: in response to receiving a negative acknowledgement from the other device, determining a fourth packet in connection with the negative acknowledgement from the at least one packet; processing the fourth packet by adding a retransmission tag to the fourth packet; and retransmitting the processed fourth packet to the other device over a second path of the plurality of paths via the RDMA protocol, over which an acknowledgement has been received.

In a second aspect, the subject matter described herein provides a device. The device comprises: a processing unit; and a memory coupled to the processing unit and storing instructions for execution by the processing unit, the instructions, when executed by the processing unit, causing the device to perform actions. The actions comprising: receiving at least one packet including at least a first packet from another device over a plurality of paths via a remote direct memory access (RDMA) protocol, the device having an RDMA connection with the other device via the plurality of paths, the first packet including at least a plurality of fields, the plurality of fields including information for transmitting the first packet over a first path of the plurality of paths.

In some implementations, the at least one packet is generated based on an RDMA message, and the plurality of fields include: a first field indicating an identifier of the first path; a second field indicating a first packet sequence number of the first packet; a third field indicating a message sequence number of the RDMA message; and a fourth field indicating a sequence number of the first packet in the RDMA message.

In some implementations, the actions further comprise: in response to receiving the first packet over the first path, generating a first acknowledgement for the first packet; and transmitting the first acknowledgement to the other device over the first path. The first acknowledgement at least include: a fifth field indicating the identifier of the first path; a sixth field indicating the first packet sequence number of the first packet; a seventh field indicating a congestion notification generated by a packet forwarding device on the first path, the congestion notification indicating a congestion condition of the first path detected by the packet forwarding device; and an eighth field indicating a maximum sequence number among packets received at the device.

In some implementations, the actions further comprise: obtaining a bitmap for recording a state of a received packet; in response to receiving the first packet over the first path, determining whether a location corresponding to the first packet is present in the bitmap; and in response to determining the location corresponding to the first packet is present in the bitmap, updating a state associated with the first packet at the location.

In some implementations, the actions further comprise: in response to determining that the location corresponding to the first packet is absent in the bitmap, determining a packet to be retransmitted based on the bitmap; generating a negative acknowledgement indicating the packet to be retransmitted; and transmitting the negative acknowledgement to the other device over the first path.

In some implementations, the actions further comprise: in response to the bitmap indicating that the at least one packet associated with the RDMA message has been received, clearing a respective location corresponding to the at least one packet in the bitmap so as to record a state of a packet associated with another RDMA message.

In some implementations, the actions further comprise: in response to receiving a second packet including a retransmission tag over a second path of the plurality of paths via the RDMA protocol, generating a second acknowledgement for the second packet by adding the retransmission tag to the second acknowledgement; and transmitting the second acknowledgement to the other device over the second path.

In some implementations, the actions further comprise: in response to receiving the first packet, determining an address for storing the first packet in a target memory; and storing the first packet at the address.

In some implementations, the first packet further includes a ninth field indicating a transmission sequence on which the first packet depends, and storing the first packet at the address comprises: in response to a third packet with a second packet sequence number having been stored in the target memory, storing the first packet at the address, the second packet sequence number being below the first packet sequence number.

In a third aspect, the subject matter described herein provides a method. The method comprises generating, based on a remote direct memory access (RDMA) message to be transmitted from a first device to a second device, at least one packet including at least a first packet, the first device having an RDMA connection with the second device via a plurality of paths, the first packet including at least a plurality of fields, the plurality of fields including information for transmitting the first packet over a first path of the plurality of paths. The method further comprises transmitting the at least one packet to the second device over the plurality of paths via an RDMA protocol, the first packet being transmitted over the first path.

In some implementations, the plurality of fields include: a first field indicating an identifier of the first path; a second field indicating a packet sequence number of the first packet; a third field indicating a message sequence number of the RDMA message; and a fourth field indicating a sequence number of the first packet in the RDMA message.

In some implementations, transmitting the at least one packet comprises: obtaining congestion control information indicating a congestion condition of the plurality of paths; determining, based on the congestion control information, whether the first packet is allowed to be transmitted; and in response to determining that the first packet is allowed to be transmitted, transmitting the first packet to the second device over the first path via the RDMA protocol.

In some implementations, the at least one packet further includes a second packet subsequent to the first packet, and transmitting the at least one packet comprises: in response to receiving a first acknowledgement for the first packet from the second device over the first path, updating the congestion control information; and controlling transmission of the second packet based on the updated congestion control information.

In some implementations, the first acknowledgement at least includes: a fifth field indicating the identifier of the first path; a sixth field indicating the packet sequence number of the first packet; a seventh field indicating a congestion notification generated by a packet forwarding device on the first path, the congestion notification indicating a congestion condition of the first path detected by the packet forwarding device; and an eighth field indicating a maximum sequential sequence number among packets received at the second device.

In some implementations, updating the congestion control information comprises: in response to receiving the first acknowledgement, updating the congestion control information at least based on the congestion notification indicated by the seventh field and the maximum sequential sequence number indicated by the eighth field.

In some implementations, updating the congestion control information comprises: in response to receiving the first acknowledgement, determining a maximum packet sequence number among packets for which acknowledgements have been received; determining an out-of-order tolerance for transmission of the at least one packet; determining, based on the maximum packet sequence number and the out-of-order tolerance, a threshold sequence number of a packet allowed to be transmitted over the first path; and updating the congestion control information at least based on the packet sequence number indicated by the sixth field and the threshold sequence number.

In some implementations, the first packet further includes a ninth field indicating a transmission sequence on which the first packet depends, and transmitting the at least one packet comprises: determining, at least based on the congestion control information and the out-of-order tolerance, a time interval for transmitting the first packet; and in response to a third packet immediately preceding the first packet in the at least one packet being transmitted, waiting at least for the time interval to transmit the first packet.

In some implementations, the method further comprises: in response to receiving a negative acknowledgement from the second device, determining a fourth packet in connection with the negative acknowledgement from the at least one packet; processing the fourth packet by adding a retransmission tag to the fourth packet; and retransmitting the processed fourth packet to the second device over a second path of the plurality of paths via the RDMA protocol, over which an acknowledgement has been received.

In a fourth aspect, the subject matter described herein provides a method. The method comprises receiving, at a second device, at least one packet including at least a first packet from a first device over a plurality of paths via a remote direct memory access (RDMA) protocol. The first device has an RDMA connection with the second device via the plurality of paths. The at least one packet includes a first packet received over the first path of the plurality of paths. The first packet includes at least a plurality of fields, which include information for transmitting the first packet over a first path of the plurality of paths.

In some implementations, the at least one packet is generated based on an RDMA message, and the plurality of fields include: a first field indicating an identifier of the first path; a second field indicating a first packet sequence number of the first packet; a third field indicating a message sequence number of the RDMA message; and a fourth field indicating a sequence number of the first packet in the RDMA message.

In some implementations, the method further comprises: in response to receiving the first packet over the first path, generating a first acknowledgement for the first packet; and transmitting the first acknowledgement to the first device over the first path. The first acknowledgement at least include: a fifth field indicating the identifier of the first path; a sixth field indicating the first packet sequence number of the first packet; a seventh field indicating a congestion notification generated by a packet forwarding device on the first path, the congestion notification indicating a congestion condition of the first path detected by the packet forwarding device; and an eighth field indicating a maximum sequence number among packets received at the second device.

In some implementations, the method further comprises: obtaining a bitmap for recording a state of a received packet; in response to receiving the first packet over the first path, determining whether a location corresponding to the first packet is present in the bitmap; and in response to determining the location corresponding to the first packet is present in the bitmap, updating a state associated with the first packet at the location.

In some implementations, the method further comprises: in response to determining that the location corresponding to the first packet is absent in the bitmap, determining a packet to be retransmitted based on the bitmap; generating a negative acknowledgement indicating the packet to be retransmitted; and transmitting the negative acknowledgement to the first device over the first path.

In some implementations, the method further comprises: in response to the bitmap indicating that the at least one packet associated with the RDMA message has been received, clearing a respective location corresponding to the at least one packet in the bitmap so as to record a state of a packet associated with another RDMA message.

In some implementations, the method further comprises: in response to receiving a second packet including a retransmission tag over a second path of the plurality of paths via the RDMA protocol, generating a second acknowledgement for the second packet by adding the retransmission tag to the second acknowledgement; and transmitting the second acknowledgement to the first device over the second path.

In some implementations, the method further comprises: in response to receiving the first packet, determining an address for storing the first packet in a target memory; and storing the first packet at the address.

In some implementations, the first packet further includes a ninth field indicating a transmission sequence on which the first packet depends, and storing the first packet at the address comprises: in response to a third packet with a second packet sequence number having been stored in the target memory, storing the first packet at the address, the second packet sequence number being below the first packet sequence number.

In a fifth aspect, the subject matter described herein provides a computer program product. The computer program product is tangibly stored in a non-transient computer storage medium and includes computer executable instructions. The computer executable instructions, when executed by a device, cause the device to perform the method according to the third or fourth aspect.

In a sixth aspect, the subject matter described herein provides a computer readable medium having computer executable instructions stored thereon. The computer executable instructions, when executed by a device, cause the device to perform the method according the third or fourth aspect.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A device for data transmission, comprising:
a processing unit; and
a memory coupled to the processing unit and storing instructions for execution by the processing unit, the instructions, when executed by the processing unit, causing the device to perform actions, the actions comprising:
generating at least one packet including at least a first packet based on a remote direct memory access (RDMA) message to be transmitted from the device to another device, the device having an RDMA connection with the other device via a plurality of paths, the first packet including at least a plurality of fields, the plurality of fields including information for transmitting the first packet over a first path of the plurality of paths, wherein the plurality of fields includes a seventh field indicating a congestion notification generated by a packet forwarding device on the first path, the congestion notification indicating a congestion condition of the first path detected by the packet forwarding device and an eighth field indicating a maximum sequential sequence number among packets received at the other device;
transmitting the at least one packet to the other device over the plurality of paths via an RDMA protocol, the first packet being transmitted over the first path; and
in response to receiving a first acknowledgement for the first packet from the other device over the first path, updating congestion control information indicating a congestion condition of the plurality of paths at least based on the congestion notification indicated by the seventh field and the maximum sequential sequence number indicated by the eighth field.

2. The device according to claim 1, wherein the plurality of fields include:
a first field indicating an identifier of the first path;
a second field indicating a packet sequence number of the first packet;
a third field indicating a message sequence number of the RDMA message; and
a fourth field indicating a sequence number of the first packet in the RDMA message.

3. The device according to claim 2, wherein transmitting the at least one packet comprises:
obtaining the congestion control information indicating a congestion condition of the plurality of paths;
determining, based on the congestion control information, whether the first packet is allowed to be transmitted; and
in response to determining that the first packet is allowed to be transmitted, transmitting the first packet to the other device over the first path via the RDMA protocol.

4. The device according to claim 3, wherein the at least one packet further includes a second packet subsequent to the first packet, and transmitting the at least one packet comprises:
in response to receiving the first acknowledgement for the first packet from the other device over the first path, updating the congestion control information; and
controlling transmission of the second packet based on the updated congestion control information.

5. The device according to claim 4, wherein the first acknowledgement at least includes:
a fifth field indicating the identifier of the first path; and
a sixth field indicating the packet sequence number of the first packet.

6. The device according to claim 1, wherein updating the congestion control information comprises:
in response to receiving the first acknowledgement, determining a maximum packet sequence number among packets for which acknowledgements have been received;
determining an out-of-order tolerance for transmission of the at least one packet;
determining, based on the maximum packet sequence number and the out-of-order tolerance, a threshold sequence number of a packet allowed to be transmitted over the first path; and
updating the congestion control information at least based on the packet sequence number indicated by the sixth field and the threshold sequence number.

7. The device according to claim 6, wherein the first packet further includes a ninth field indicating a transmission sequence on which the first packet depends, and transmitting the at least one packet comprises:

determining, at least based on the congestion control information and the out-of-order tolerance, a time interval for transmitting the first packet; and in response to a third packet immediately preceding the first packet in the at least one packet being transmitted, waiting at least for the time interval to transmit the first packet.

8. The device according to claim 1, the actions further comprising:

in response to receiving a negative acknowledgement from the other device, determining a fourth packet in connection with the negative acknowledgement from the at least one packet;

processing the fourth packet by adding a retransmission tag to the fourth packet; and retransmitting the processed fourth packet to the other device over a second path of the plurality of paths via the RDMA protocol, over which an acknowledgement has been received.

9. A device for data transmission, comprising:

a processing unit; and a memory coupled to the processing unit and storing instructions for execution by the processing unit, the instructions, when executed by the processing unit, causing the device to perform actions, the actions comprising:

receiving at least one packet including at least a first packet from another device over a plurality of paths via a remote direct memory access (RDMA) protocol, the device having an RDMA connection with the other device via the plurality of paths, the first packet including at least a plurality of fields, the plurality of fields including information for transmitting the first packet over a first path of the plurality of paths;

in response to receiving the first packet over the first path, generating a first acknowledgement for the first packet, wherein the first acknowledgment includes a seventh field indicating a congestion notification generated by a packet forwarding device on the first path, the congestion notification indicating a congestion condition of the first path detected by the packet forwarding device and an eighth field indicating a maximum sequential sequence number among packets received at the device; and transmitting the first acknowledgement to the other device over the first path.

10. The device according to claim 9, wherein the at least one packet is generated based on an RDMA message, and the plurality of fields include:

a first field indicating an identifier of the first path;

a second field indicating a first packet sequence number of the first packet;

a third field indicating a message sequence number of the RDMA message; and a fourth field indicating a sequence number of the first packet in the RDMA message.

11. The device according to claim 9, the first acknowledgement further comprising:

a fifth field indicating the identifier of the first path;

a sixth field indicating the first packet sequence number of the first packet.

12. The device according to claim 9, the actions further comprising:

obtaining a bitmap for recording a state of a received packet;

in response to receiving the first packet over the first path, determining whether a location corresponding to the first packet is present in the bitmap; and in response to determining the location corresponding to the first packet is present in the bitmap, updating a state associated with the first packet at the location.

13. The device according to claim 12, the actions further comprising:

in response to determining that the location corresponding to the first packet is absent in the bitmap, determining a packet to be retransmitted based on the bitmap;

generating a negative acknowledgement indicating the packet to be retransmitted; and transmitting the negative acknowledgement to the other device over the first path.

14. A computer-implemented method comprising:

generating, based on a remote direct memory access (RDMA) message to be transmitted from a first device to a second device, at least one packet including at least a first packet, the first device having an RDMA connection with the second device via a plurality of paths, the first packet including at least a plurality of fields, the plurality of fields including information for transmitting the first packet over a first path of the plurality of paths, wherein the plurality of fields includes a seventh field indicating a congestion notification generated by a packet forwarding device on the first path, the congestion notification indicating a congestion condition of the first path detected by the packet forwarding device and an eighth field indicating a maximum sequential sequence number among packets received at the other device;

transmitting the at least one packet to the second device over the plurality of paths via an RDMA protocol, the first packet being transmitted over the first path and in response to receiving a first acknowledgement for the first packet from the other device over the first path, updating congestion control information indicating a congestion condition of the plurality of paths at least based on the congestion notification indicated by the seventh field and the maximum sequential sequence number indicated by the eighth field.

* * * * *